United States Patent [19]

Hijikata et al.

[11] Patent Number: 4,969,044
[45] Date of Patent: Nov. 6, 1990

[54] AUTOMATIC FOCUSING SYSTEM FOR USE IN CAMERAS HAVING ZOOMING FUNCTION

[75] Inventors: Isao Hijikata, Yokohama; Toshiharu Hida, Tokyo, both of Japan

[73] Assignee: Victor Company of Japan, Ltd., Yokohama, Japan

[21] Appl. No.: 354,317

[22] Filed: May 19, 1989

[30] Foreign Application Priority Data

May 20, 1988 [JP] Japan .................................. 63-124570

[51] Int. Cl.$^5$ ........................................... H04N 5/232
[52] U.S. Cl. ...................................... 358/227; 358/210
[58] Field of Search ................... 358/228, 225, 213.13, 358/210

[56] References Cited

U.S. PATENT DOCUMENTS

| | | | |
|---|---|---|---|
| 4,609,944 | 9/1986 | Nakada et al. | 358/228 |
| 4,621,292 | 11/1986 | Hirao et al. | 358/227 |
| 4,631,590 | 12/1986 | Yamada et al. | 358/210 |
| 4,706,124 | 11/1987 | Baba et al. | 358/227 |
| 4,717,959 | 1/1988 | Isago | 358/227 |
| 4,735,494 | 4/1988 | Makino et al. | 358/227 |
| 4,740,820 | 4/1988 | Kinoshita | 358/213.13 |
| 4,762,986 | 8/1988 | Suda et al. | 250/201 |

FOREIGN PATENT DOCUMENTS 2948752  6/1980  Fed. Rep. of Germany .
60-212071 10/1985 Japan .

*Primary Examiner*—Stephen Brinich
*Attorney, Agent, or Firm*—Pollock, VandeSande & Priddy

[57] ABSTRACT

There is disclosed herein an automatic focusing system including an optical system having a focus lens, a zoom lens and an image pickup device for converting a light beam from an object into a corresponding electrical signal. The automatic focusing system comprising a filter for deriving a predetermined component of the electrical signal, a detector for detecting a focus voltage of the predetermined component and a drive circuit for moving the focus lens and zoom lens in the directions of the optical axis of the optical system. Also included in the focusing system is a control unit which moves the focus lens through the drive circuit to bring the focus lens into the fous positon and, when the focus position is not taken in a predetermiend movable range, moves the zoom lens toward the wide-angle side before again moving the focus lens so as to take the focus position.

2 Claims, 5 Drawing Sheets

AUTOMATIC FOCUSING SYSTEM FOR USE IN CAMERAS HAVING ZOOMING FUNCTION

BACKGROUND OF THE INVENTION

The present invention relates generally to automatic focusing systems, and is applicable particularly to video cameras having a zooming function.

Various types of video cameras are known which are generally provided with an optical system comprising a focus lens and a zoom lens so that focusing operation is effected by movement of the focus lens in the directions along the optical axis of the optical system and further zooming operation is performed by movement of the zoom lens in the same optical axis directions.

In such a video camera, when the position of the zoom lens on the optical axis is shifted from the telephoto side to the wide-angle side or vice versa, the focus lens is moved in accordance with the distance to an object to be taken in connection with the movement of the zoom lens so as to always keep the focusing state.

In the above-mentioned video camera having a zooming function, the relation between the positions of the focus lens and the zoom lens on the optical axis, as shown in FIG. 7, varies in accordance with distances $u_1$, $u_2$, ..., $u_n$ to the object to be taken in focus by the video camera. As obvious from curves showing the relation between the position of the focus lens and the position of the zoom lens, as the distance to the object is shorter, the inclination is smaller as indicated by the curve $u_n$, whereas in accordance with lengthening of the distance to the object, the inclination is greater as indicated by the curve $u_1$. Accordingly, in cases where the distance to the object is considerably short, there is a problem which arises with the prior art video cameras in that, when the zoom lens is positioned at the telephoto side, difficulty is encountered to attain the focusing state in the movable range of the focus lens.

SUMMARY OF THE INVENTION

It is therefore an object of the present invention to provide an automatic focusing system which is capable of surely bring the focus lens into the focus position.

With this and other objects which will become apparent as the description proceeds, an automatic focusing system ccording to the present invention includes an optical system having at least a focus lens movable in a first predetermined movable range in directions along an optical axis of the optical system and a zoom lens movable in a second predetermined movable range between a telephoto side and a wide-angle side in the optical axis directions and further includes an image pickup device for converting a light beam incident thereon from an object through the focus lens and the zoom lens into a corresponding electrical signal, the automatic focusing system comprising: filter means coupled to the image pickup device for deriving a predetermined component of the electrical signal from the image pickup device; detector means coupled to the filter means for detecting a focus voltage of the derived predetermined component of the electrical signal, the level of the detected focus voltage being varied in accordance with the positions of said focus lens and the zoom lens so as to become maximum when a focus position is taken with respect to the object; drive means for driving the focus lens and the zoom lens in the directions of the optical axis of the optical system; and control means coupled to the detector means for successively comparing the detected focus voltage with each of a plurality of predetermined reference voltages and coupled to the drive means for controlling the positions of the focus lens and the zoom lens, the control means moving the focus lens through the drive means to bring the focus lens into the focus position and, when the focus position is not taken in the first predetermined movable range, moving the zoom lens before again moving the focus lens so as to take the focus position.

BRIEF DESCRIPTION OF THE DRAWINGS

The present invention will be described in further detail with reference to the accompanying drawings, in which.

DETAILED DESCRIPTION OF THE INVENTION

Figure 1:
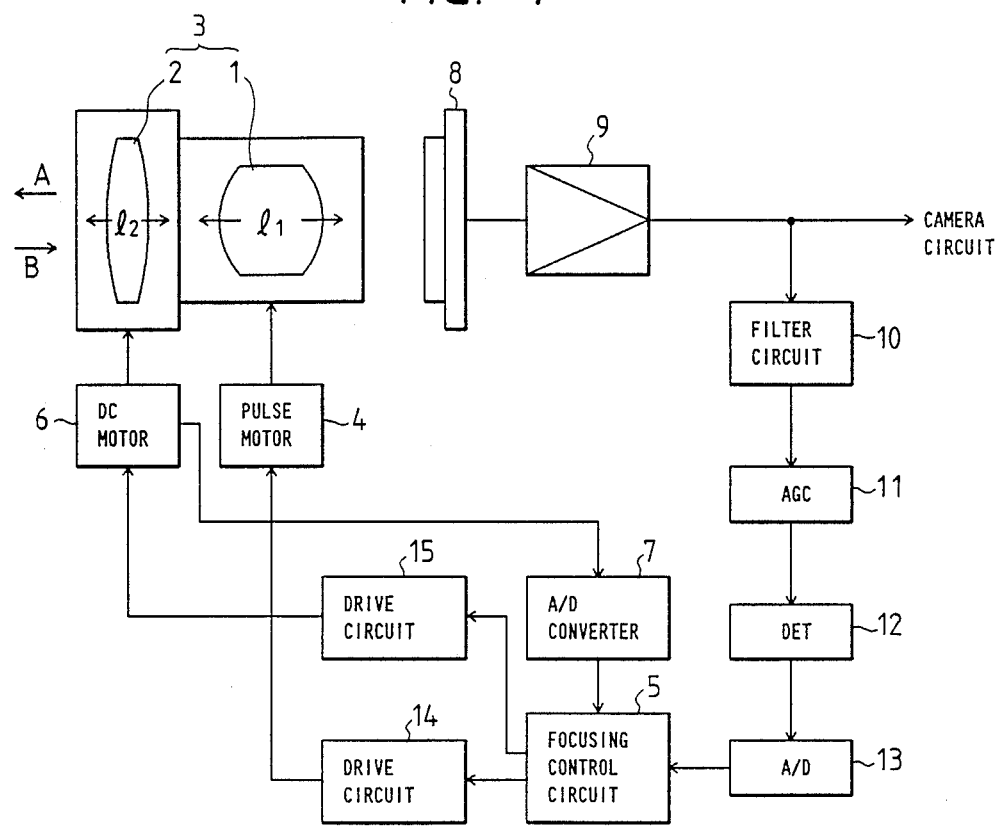
FIG. 1 is a block diagram showing an embodiment of an automatic focusing system according to the present invention.

Referring now to FIG. 1, there is schematically illustrated an embodiment of an automatic focusing system according to the present invention. In FIG. 1, the automatic focusing system is equipped with an optical system 3 having a rear-side focus lens 1 and a front-side zoom lens 2. In this automatic focusing system, the focus lens 1 is adapted to be movable in a range $l_1$ (from the infinite point to the closest point) in the directions (indicated by arrows A and B in FIG. 1) along the optical axis of the optical system 3 so as to perform focusing operation. The movement of the focus lens 1 is performed by a pulse motor 4 which is coupled through a drive circuit 14 to a focusing control circuit 5 so as to be controlled in accordance with control signals such as pulses from the focusing control circuit 5, which may comprise a well-known microcomputer including a central processing unit (CPU), a random access memory (RAM), a read-only memory (ROM) and so on. The position of the focus lens 1 on the optical axis is detected and stored in the focusing control circuit 5, the detection of the position thereof being performed by counting the pulses to be supplied for rotationally driving the pulse motor 4, for example. Similarly, the zoom lens 2 is arranged to be movable in a range of $l_2$ in the directions of the arrows A and B along along the optical axis of the optical system 3 so as to effect zooming operation. The movement of the zoom lens 2 is made by a DC motor 6 which is controlled through another drive circuit 15 in accordance with a zooming control signal from the focusing control circuit 5. The DC motor 6 is provided with a rotary encoder, not shown, for detecting rotation of the DC motor 6 so as to detect the position of the zoom lens 2 on the optical axis. The output of the rotary encoder indicative of the position of the zoom lens 2 is supplied through an A/D converter 7 to the focusing control circuit 5.

Figure 2:
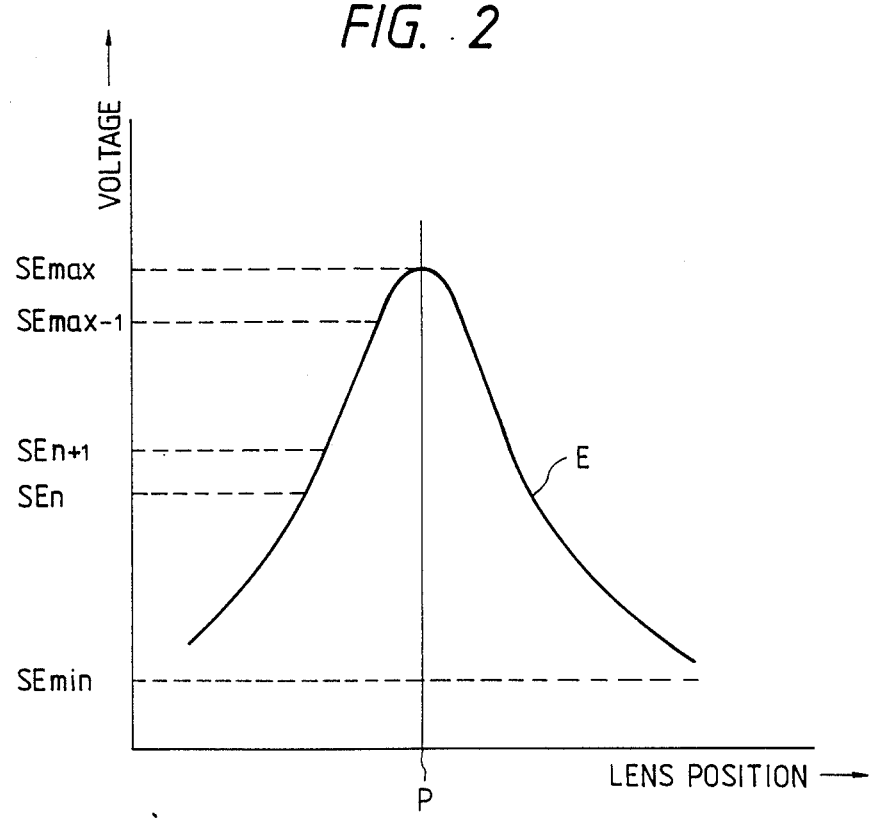
FIG. 2 is a graphic diagram showing a curve of focus voltages.

On the other hand, a light beam having optical information relating to an object taken by the camera reaches an image pickup device 8 such as a CCD (charged-coupled device) after passed through the optical system 3, the image pickup device 8 producing an electrical signal (image signal) corresponding to the optical information by means of the photo-electric conversion. The image signal is supplied to an amplifier 9 output signal of which is delivered to a camera circuit, not shown, and further to a filter circuit 10. This filter circuit 10 extracts a predetermined frequency component from the image signal and supplies it to an automatic gain control circuit (AGC) 11. The automatic gain control circuit 11 keeps the predetermined frequency component below a predetermined level and then delivers the gain-controlled predetermined frequency component to a detector (DET) 12 where a fucus voltage E is derived in correspondance with the predetermined frequency component of the image signal as shown in FIG. 2.

Here, the focus voltage E corresponds to the degree of sharpness of the resultant image due to reproduction of the image signal and its level becomes maximum when the focus lens 1 takes the focus position for the object. This focus voltage E is digitized by an A/D (analog-to-digital) converter 13 and subsequently supplied to the above-mentioned focusing control circuit 5.

On the basis of the fact that the voltage level of the high-frequency component of the image signal produced by taking the object as described above corresponds to the degree of sharpness of the reproduction image, the focusing control circuit 5 derives the voltage of the high-frequency component as a focus voltage and performs focusing control in which the focus lens 1 is moved so that the level of the focus voltage becomes maximum, thereby resulting in taking the focus position. Therefore, the focusing control circuit 5 successively samples the focus voltage every field from a start of the focusing operation in response to movement of the focus lens in the optical axis directions. Moreover, the focusing control circuit 5 prestores a plurality of reference voltage values SEmin to SEmax as illustrated in FIG. 2 so as to successively compare the consecutively sampled focus voltages in level with the plurality of reference voltage values. If one of the consecutively sampled focus voltages is equal to any one of the plurality of reference voltage values, the reference voltage value is read by the focusing control circuit 5.

When the read reference voltage value SEn is greater than the previously read reference voltage value, determination is made where the focus lens 1 has not come to the focus position P yet, and therefore a focusing control signal is further supplied through a drive circuit 14 to the pulse motor 4 so that the focus lens 1 is continually moved.

Figure 3:
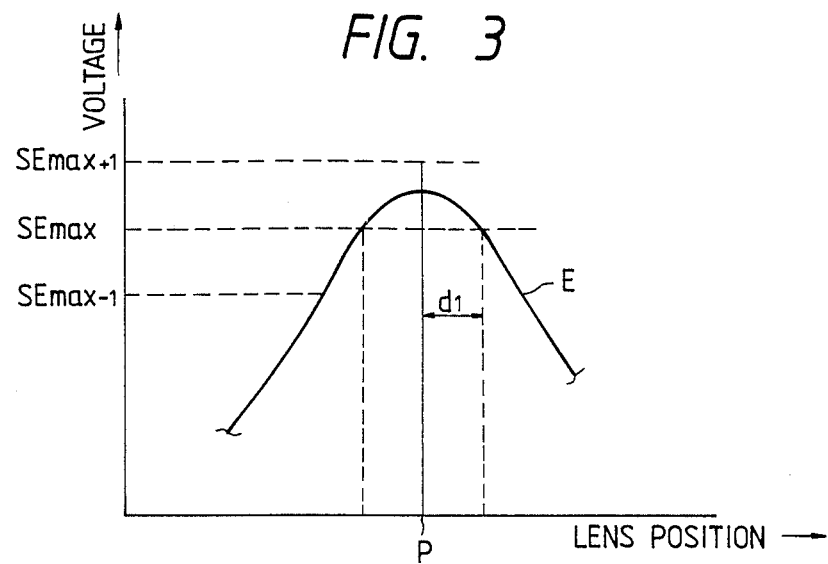
FIGS. 3 and 4 are graphic diagrams showing the relation between the focus voltages and reference voltage values.

Here, in this embodiment, the focus voltage is inputted to the focusing control circuit 5 as descrete information at every field. Therefore, when the inputted focus voltage first crosses over one (SEn) of the reference voltage values, the focusing control circuit 5 regards the focus voltage as become equal to the reference voltage value SEn and reads the reference voltage value SEn together with the position data of the focus lens 1 at that time. Furthermore, as shown in FIG. 3, when the read reference voltage value successively becomes equal two times to the maximum reference voltage value SEmax, determination is made where the focus position P is at the middle point between the positions corresponding to the first and second maximum reference voltage values SEmax. In the case, the focus lens 1 is moved back to the middle point therebetween, thereby resulting in taking the focus state. Therefore, the focusing control circuit 5 outputs a focusing control signal to cause the pulse motor 4 to rotate in the reverse direction so that the focus lens 1 is moved back by a distance dl in the direction opposite to the previously moving direction, thereby resulting in focusing. Here, the distance dl is calculated on the basis of the position data of the focus lens 1 read together with the first and second maximum reference voltage values SEmax.

Figure 4:
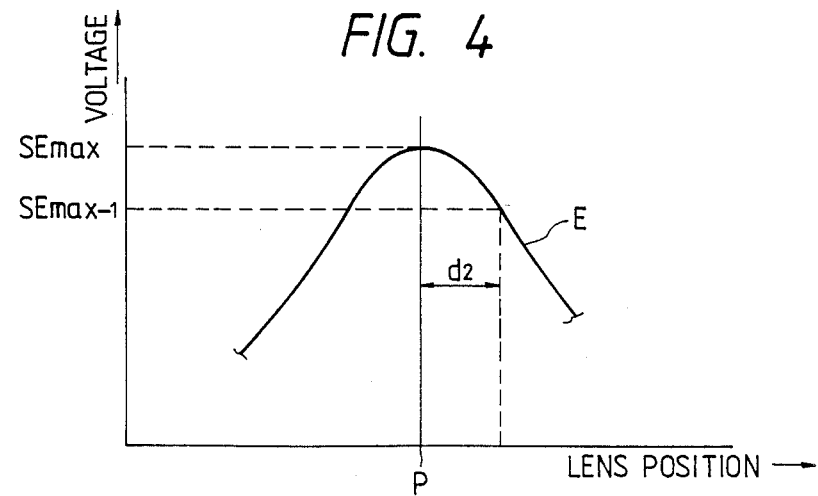

On the other hand, as shown in FIG. 4, when the read reference voltage value SEmax-1 is samller than the previously read reference voltage value SEmax, the previously read position results in the focus position P. Thus, in this case, the focus state can be obtained by returning the focus lens 1 to the previously read position. Accordingly, the focusing control circuit 5 similarly outputs a focusing control signal to cause the pulse motor 4 to rotate in the opposite direction so that the focus lens 1 is moved back by a distance d2 in the opposite direction to thereby take the focusing position P.

Figure 5:
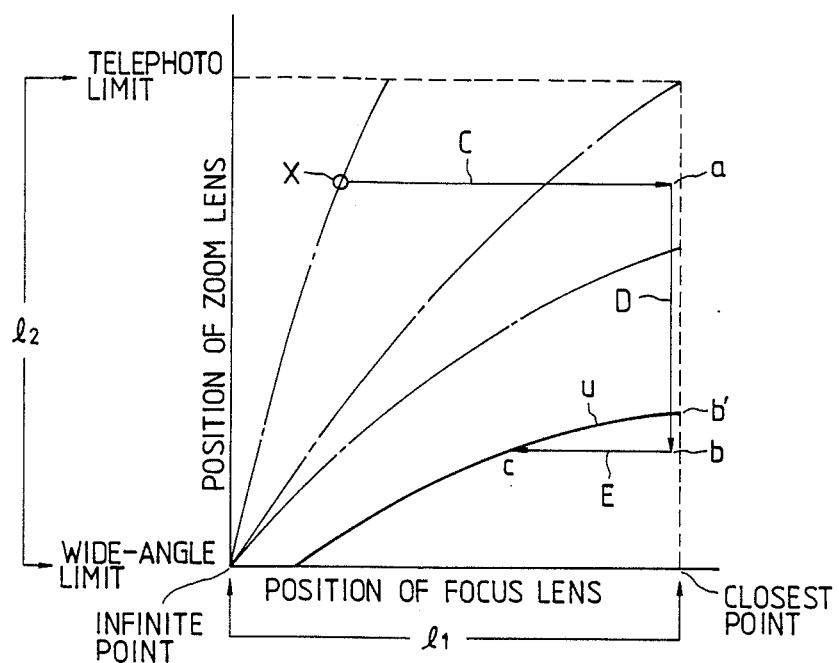
FIG. 5 is a graphic illustration of the relation between the positions of the focus lens and zoom lens during the focusing.
Figure 7:
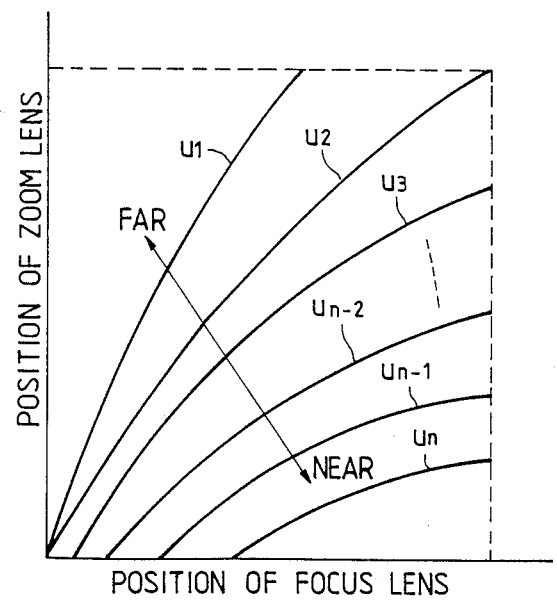
FIG. 7 is a graphic diagram generally showing the relation between the positions of the zoom lens and focus lens with respect to the distance to an object to be taken by a camera.

On the other hand, as shown in FIG. 5, in the case that the focus position is not yet taken even when the focus lens 1 is moved in a direction of an arrow C up to an end of the movable range 1 by the above-described focusing operation, the focusing control circuit 5 supplies a zooming control signal so that the zoom lens 2 is moved toward the wide-angle side, i.e., in the direction of an arrow D in FIG. 5.

Here, as an example that the focus position is not taken irrespective of the movement of the focus lens 1, there is the case that the focus lens 1 is positioned at an X point of the telephoto side and the distance to the object is considerably short as indicated by u in FIG. 5. Therefore, in this case, the zoom lens 2 is moved toward the wide-angle side in accordance with the distance u to the object, thereby resulting in the focus state. That is, by moving the zoom lens 2 toward the wide-angle side, the focus voltage E varies as shown in FIG. 2, and the zoom lens 2 is moved on the basis of the focus voltage for the focusing, thereby resulting in obtaining the focus position.

Here, in this embodiment, in the case that the zoom lens 2 passes the position for obtaining the focus position, the movement of the zoom lens 2 is stopped, and the focus lens 1 is then moved in the direction of an arrow E in FIG. 5 so as to finally perform the focusing, because the movement of the focus lens 1 can ensure more accurate focusing operation as compared with that of the zoom lens 2. Thus, in the automatic focusing system according to this embodiment, in the focusing operation, by moving not only the focus lens 1 but also the zoom lens if required, irrespective of the position of the zoom lens 2, it is possible to surely perform the automatic focusing.

Figure 6:
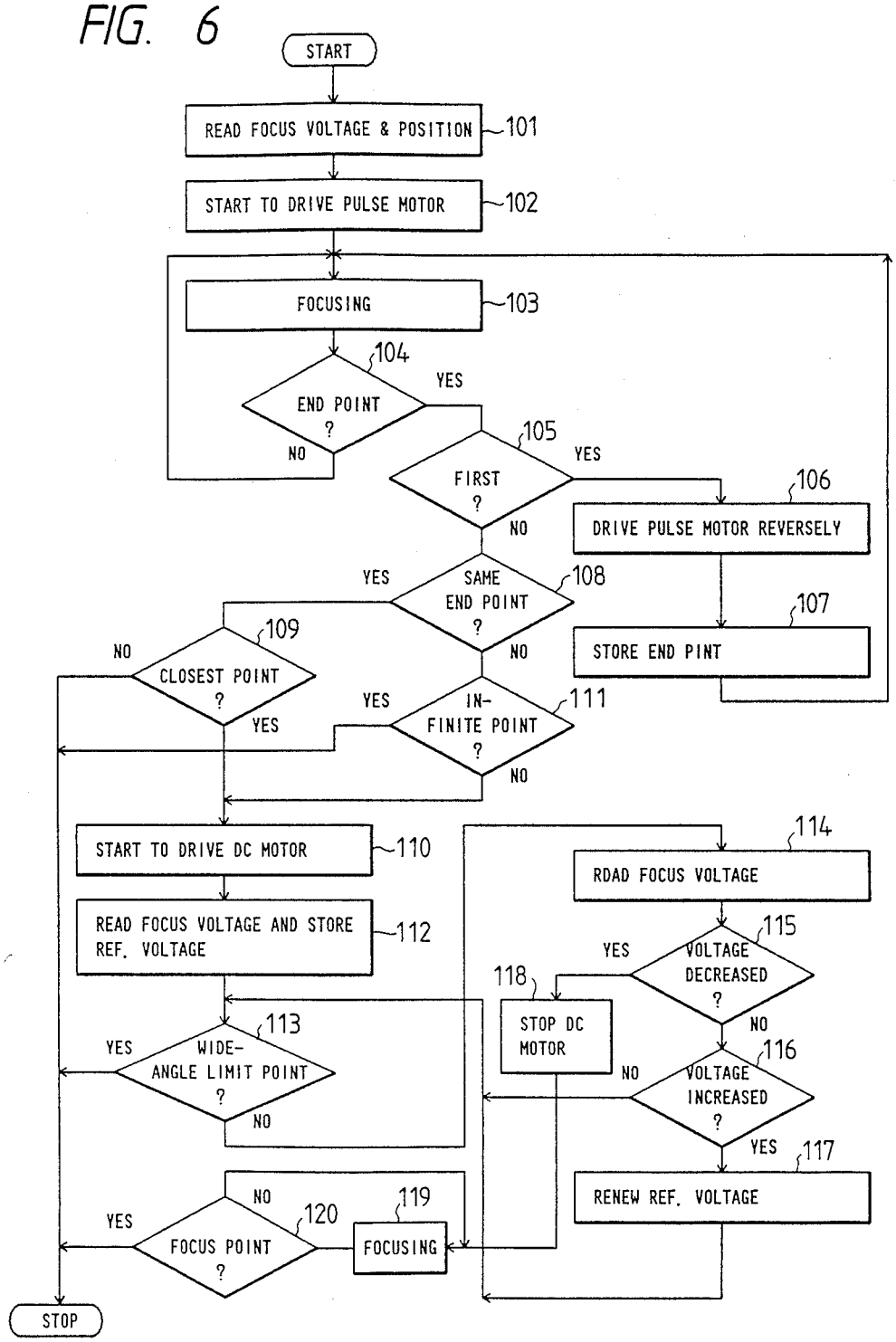
FIG. 6 is a flow chart for describing the focusing operation in this embodiment.

FIG. 6 is a flow chart for a better understanding of this embodiment of an automatic focusing control system. A description of the focusing control in this embodiment will be given with reference to FIGS. 5 and 6. In FIG. 6, the focusing control starts with a state 101 to read the present position (for example, X in FIG. 5) of the focus lens 1 and a focus voltage corresponding to the present position thereof. Control goes to a step 102 to start to drive the pulse motor 4 in a predetermined direction in the movable range of the focus lens 1 so as to perform the above-mentioned focusing operation in the next step 103. A step 104 is provided in order to check whether the focus lens 1 has arrived at an end point of the movable range of the focus lens 1 (a in FIG. 5). If the answer of the step 104 is negative, the operational flow returns to the previous step 103. On the other hand, if the answer of the step 104 is affirmative, control goes to a step 105 to check whether the arrival of the focus lens 1 at the end point is for the first time. If the answer of the step 105 is "YES", the step 105 is followed by steps 106 and 107 so as to move the focus lens 1 in the opposite direction and store the arrival end point. If the answer is "NO", control goes to a step 108 to check whether the arrival end point for is the second is the same as that for the first time. If so, a step 109 follows to check whether the arrival point is the closest point. If not, this focusing operation is stopped. If so, control goes to a step 110. On the other hand, if the answer of the step 108 is "NO", control goes to a step 11 to check whether the arrival point is the infinite point. If so, this focusing operation is stopped. If not, control goes to the step 110. The step 110 starts the zoom lens 2 moving toward the wide-angle side (from a toward b in FIG. 5), followed by a step 112 to read the focus voltage in accordance with the movement of the zoom lens 2, and stores the maximum from among the reference voltage values which are not greater than the read focus voltage. Control advances to a step 113 to check whether the zoom lens 2 has arrived at the wide-angle limit point. When arrived at the wide-angle limit point, this focusing operation is stopped. If not, the focus voltage is subsequently read in a step 114. A step 115 follows to check whether the focus voltage is decreased, that is, whether the zoom lens 2 has passed beyond a focus point (b' in FIG. 5). If not, control proceeds to a step 116 to check whether the focus voltage is so increased as to cross over the reference voltage value next greater than the stored reference voltage value. If not, control goes to the step 113. If so, a step 117 follows to renew the stored reference voltage value to the next higher reference voltage value. After the termination of the step 117, the operational folow returns to the step 113. On the other hand, if the answer of the step 115 is "YES", the DC motor 6 is stopped in a step 118, and a step 119 is executed to move the focus lens 1 in the opposite direction (from b to c in FIG. 5), followed by a step 120 to check whether the focus lens has reached the focus position (c in FIG. 5). If so, this focusing operation is terminated. If not, the state 120 is followed by the step 119.

In the above-mentioned embodiment, since the zoom lens 2 is moved with the focus voltage being detected, and therefore the moving distance of the zoom lens 2 for the focusing becomes minimum, thereby resulting in realizing a quicker focusing. Particularly since the moving distance of the zoom lens 2 becomes short, it is possible to reduce variation of a field of view during the focusing.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. An automatic focusing system including an optical system having at least a focus lens movable in a first predetermined movable range in directions along an optical axis of said optical system and a zoom lens movable in a second predetermined movable range between a telephoto side and a wide-angle side in the optical axis directions and further including an image pickup device for converting a light beam incident thereon from an object through said focus lens and said zoom lens into a corresponding electrical signal, said automatic focusing system comprising:

filter means coupled to said image pickup device for deriving a predetermined component of said electrical signal from said image pickup device;

detector means coupled to said filter means for detecting a focus voltage of the derived predetermined component of said electrical signal, the level of the detected focus voltage being varied in accordance with the positions of said focus lens and said zoom lens so as to become at a maximum when a focus position is taken with respect to said object;

drive means for driving said focus lens and said zoom lens in the directions of the optical axis of said optical system; and control means coupled to said detector means for successively comparing the detected focus voltage with each of a plurality of predetermined reference voltages and coupled to said drive means for controlling the positions of said focus lens and said zoom lens, said control means moving said focus lens through said drive means to bring said focus lens into the focus position and, when the focus position is not taken in the first predetermined movable range, moving said zoom lens before again moving said focus lens so as to take the focus position.

2. An automatic focusing system as claimed in claim 1, wherein said control means moves said zoom lens to the wide-angle side until the detected focus voltage is decreased and then moves said focus lens in a direction opposite to the previously moving direction.

* * * * *